US009413813B2

(12) United States Patent
Robert

(10) Patent No.: US 9,413,813 B2
(45) Date of Patent: *Aug. 9, 2016

(54) SYSTEM AND METHOD FOR PROVIDING MEDIA CONTENT

(71) Applicant: Disney Enterprises, Inc., Burbank, CA (US)

(72) Inventor: Arnaud Robert, Simi Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 13/746,255

(22) Filed: Jan. 21, 2013

(65) Prior Publication Data

US 2013/0129325 A1 May 23, 2013

Related U.S. Application Data

(63) Continuation of application No. 12/383,668, filed on Mar. 26, 2009, now Pat. No. 8,364,657.

(60) Provisional application No. 61/110,484, filed on Oct. 31, 2008, provisional application No. 61/110,488, filed on Oct. 31, 2008, provisional application No. 61/110,485, filed on Oct. 31, 2008.

(51) Int. Cl.
*G06F 17/30* (2006.01)
*H04L 29/08* (2006.01)
*G11B 27/034* (2006.01)
*H04N 9/87* (2006.01)

(52) U.S. Cl.
CPC .......... *H04L 67/10* (2013.01); *G06F 17/30979* (2013.01); *G11B 27/034* (2013.01); *H04N 9/87* (2013.01)

(58) Field of Classification Search
CPC .............. G06F 17/30; G06F 17/30038; G06F 17/30058; H04N 9/87; H04L 67/10
USPC .................................... 707/769, 705; 386/353
See application file for complete search history.

(56) References Cited

U.S. PATENT DOCUMENTS

| | | | |
|---|---|---|---|
| 7,047,241 B1 * | 5/2006 | Erickson | 707/999.01 |
| 7,870,497 B2 * | 1/2011 | Greer et al. | 715/762 |
| 7,962,933 B2 * | 6/2011 | Huang et al. | 725/32 |
| 2001/0042043 A1 * | 11/2001 | Shear et al. | 705/51 |
| 2002/0107973 A1 | 8/2002 | Lennon | |
| 2004/0024720 A1 | 2/2004 | Fairweather | |
| 2004/0078484 A1 | 4/2004 | Parry | |

(Continued)

*Primary Examiner* — Vincent F Boccio
(74) *Attorney, Agent, or Firm* — Farjami & Farjami LLP

(57) ABSTRACT

There is presented a system for providing a content stored on a medium, the system comprising a media presentation module including a processor. The processor is configured to retrieve a content payload including a digital content from a data structure residing on the medium, and to retrieve a content-describing metadata stored separately from the digital content, from the data structure. The content-describing metadata provide content information including media encoding information for the digital content and a media profile information for the digital content. The content-describing metadata are configured to provide the content information to the media presentation module prior to rendering the digital content. In one embodiment, the processor is further configured to configure the media presentation module based on the media encoding information and the media profile information, and to present the content on a display.

20 Claims, 3 Drawing Sheets

(56) References Cited

U.S. PATENT DOCUMENTS

| | | |
|---|---|---|
| 2005/0276570 A1 | 12/2005 | Reed |
| 2005/0289277 A1* | 12/2005 | Jackson et al. ................ 709/250 |
| 2006/0105841 A1 | 5/2006 | Rom |
| 2006/0122882 A1 | 6/2006 | Brown |
| 2006/0128470 A1 | 6/2006 | Willis |
| 2006/0265427 A1* | 11/2006 | Cohen et al. ................ 707/200 |
| 2007/0039018 A1 | 2/2007 | Saslow |
| 2007/0067427 A1 | 3/2007 | Bugir |
| 2007/0078898 A1 | 4/2007 | Hayashi |
| 2007/0083380 A1 | 4/2007 | Martinez |
| 2007/0083558 A1 | 4/2007 | Martinez |
| 2007/0083762 A1 | 4/2007 | Martinez |
| 2007/0100834 A1 | 5/2007 | Landry |
| 2007/0130127 A1 | 6/2007 | Passmore |
| 2007/0157242 A1 | 7/2007 | Cordray |
| 2007/0162611 A1 | 7/2007 | Yu |
| 2007/0180133 A1 | 8/2007 | Vedantham |
| 2007/0185815 A1 | 8/2007 | Boccon-Gibod |
| 2007/0219937 A1 | 9/2007 | Lee |
| 2007/0233740 A1 | 10/2007 | Nichols |
| 2007/0250781 A1 | 10/2007 | Dolph |
| 2008/0021926 A1 | 1/2008 | Brock |
| 2008/0025707 A1* | 1/2008 | Sawada et al. ................ 386/126 |
| 2008/0091606 A1 | 4/2008 | Grecia |
| 2008/0098004 A1 | 4/2008 | Matsuoka |
| 2008/0126543 A1 | 5/2008 | Hamada |
| 2008/0162498 A1 | 7/2008 | Omoigui |
| 2008/0168523 A1 | 7/2008 | Ansari |
| 2008/0195664 A1 | 8/2008 | Maharajh |
| 2008/0201225 A1 | 8/2008 | Maharajh |
| 2008/0215426 A1 | 9/2008 | Guldimann |
| 2008/0215437 A1 | 9/2008 | Levy |
| 2008/0215979 A1 | 9/2008 | Clifton |
| 2008/0240010 A1 | 10/2008 | Vasudevan |
| 2008/0250035 A1 | 10/2008 | Smith |
| 2008/0269931 A1 | 10/2008 | Martinez |
| 2009/0106279 A1 | 4/2009 | Bae |
| 2009/0204475 A1 | 8/2009 | Cohen |
| 2010/0235428 A1 | 9/2010 | Kikkawa |

* cited by examiner

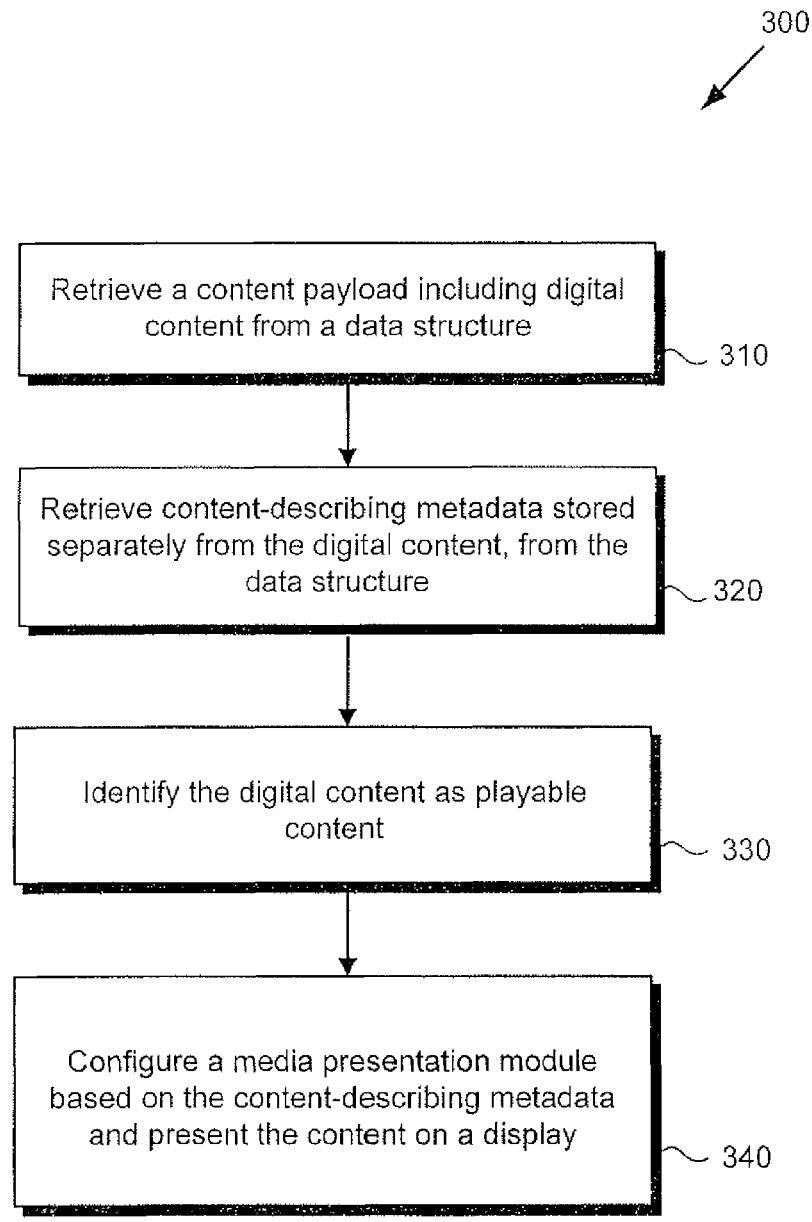

SYSTEM AND METHOD FOR PROVIDING MEDIA CONTENT

RELATED APPLICATIONS

This application is a continuation of U.S. application Ser. No. 12/383,668 filed on Mar. 26, 2009, which claims priority to U.S. Provisional Application No. 61/110,488 filed on Oct. 31, 2008, U.S. Provisional Application No. 61/110,484 filed on Oct. 31, 2008, and U.S. Provisional Application No. 61/110,485 filed on Oct. 31, 2008, which are hereby incorporated by reference in their entirety.

BACKGROUND OF THE INVENTION

1. Field of the Invention

The present invention relates generally to the management of media content. More particularly, the present invention relates to systems and methods for enabling a presentation system to optimize presentation of media content.

2. Background Art

Films, television programming, entertainment trailers, and the like, are examples of content that lends itself to distribution in the form of media files. In general, media files may be described as containing media elements that can be processed by a media player and rendered on a display device to present audio, video, and multimedia content to a consumer. Media content contained in a data file may be encoded according to an increasingly wide variety of standardized and proprietary encoding formats. Each encoding format can be decoded by a compatible codec to generate signals suitable for presentation on a media presentation system such as a television, computer monitor, or mobile communication device display, for example. In many instances, more than one codec variable or profile are available for a particular encoding format. Under those circumstances, each alternative codec profile might perform differently, and one in particular may provide superior performance for a specific set of parameters. In other instances, a compatible codec may not be available at all, and the encoded media may then have to be transcoded from a first encoding format to a second encoding format that is compatible with an available codec to be viewed, or, if transcoding is not possible, the encoded media cannot be viewed at all.

Within a media file, the codec specific information is typically carried in the encoded portion of the media content. For example, codec specific information may be carried in the header portion of a Moving Picture Experts Group (MPEG) stream. There are, however, several disadvantages associated with this conventional inclusion of codec information in the encoded media content itself. One significant disadvantage to this conventional approach is that a media player, for example, must begin decoding the media content to obtain the codec specific information. A second disadvantage is that the codec information encoded into the media content according to the conventional approach does not provide guidance for optimizing presentation of the media content for a given set of playback system or display constraints; it merely provides information on how the media was encoded prior to distribution. As a result, playback systems may decide in an ad hoc manner to modify the presentation of the content using its own set of viewing parameters. This is especially true in the case wherein one or more of the specified encoding parameters cannot be supported by the playback device. The result in many cases is a viewing experience dictated by the playback device, and independent of the original encoding parameters.

Another disadvantage associated with the conventional approach is that when the producers of media content encodes that content for distribution, they may do so in a manner that targets a specific codec, certain decoding parameters, or certain playback systems, for example. Nevertheless, there is no mechanism to require or ensure that those targeted conditions will in fact exist when the media file is decoded and presented. As a result, the presentation experience of a consumer of the media content may be different from that intended by the producers and/or creators of the content.

For example, headers of encoded video may contain information describing encoding parameters such as the bit rate, aspect ratio, and the video profile. In addition, those headers may indicate the file size, include metadata, and identify the locations of the video and audio tracks in the media file. That header information describes attributes of the media content and/or encoders and/or how the source was compiled, but it does not convey any information about how the media file is to be viewed. In other words, despite certain assumptions about the presentation experience having informed the upstream transcoding and encoding processes, instructions for producing a presentation experience corresponding to those upstream assumptions are typically not included in the media file. Consequently, there may exist a significant aesthetic disjunction between the presentation experience intended by the creators and/or producers of the media content, and that actually experienced by the consumer.

The disjunction may be particularly acute when the playback system and the rendering system are not the same, for example, when a playback system such as a cable box, optical disc player, or game console is rendered on a television set. In these situations, the two systems may operate independently of one another to affect the viewing experience, according to their own respective rules, which are not guided by the intent of the content creators or producers. Moreover, game controllers and mobile communication devices provide examples of multi-function playback systems that are designed for very diverse functions (e.g., game playback as well as film playback as well as telecommunications) and in which the graphics processes may be optimized by default for non-media playback functions, to the detriment of media playback. The absence of a mechanism for conveying parameters corresponding to the intended presentation experience prevents these devices from adjusting their settings so as to improve the presentation experience for the consumer.

Accordingly, there is a need to overcome the drawbacks and deficiencies in the art by providing a solution for optimizing presentation of media content across a wide range of playback and viewing devices. It is desirable that the solution enable a creator and/or producer of the content to convey presentation guidelines to rendering and/or playback systems so as to allow those systems to optimize the presentation in a manner consistent with their performance capabilities.

SUMMARY OF THE INVENTION

There are provided systems and methods for providing media content, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 is a flowchart of a method for providing media content, according to one embodiment of the present invention.

DETAILED DESCRIPTION OF THE INVENTION

Figure 1:
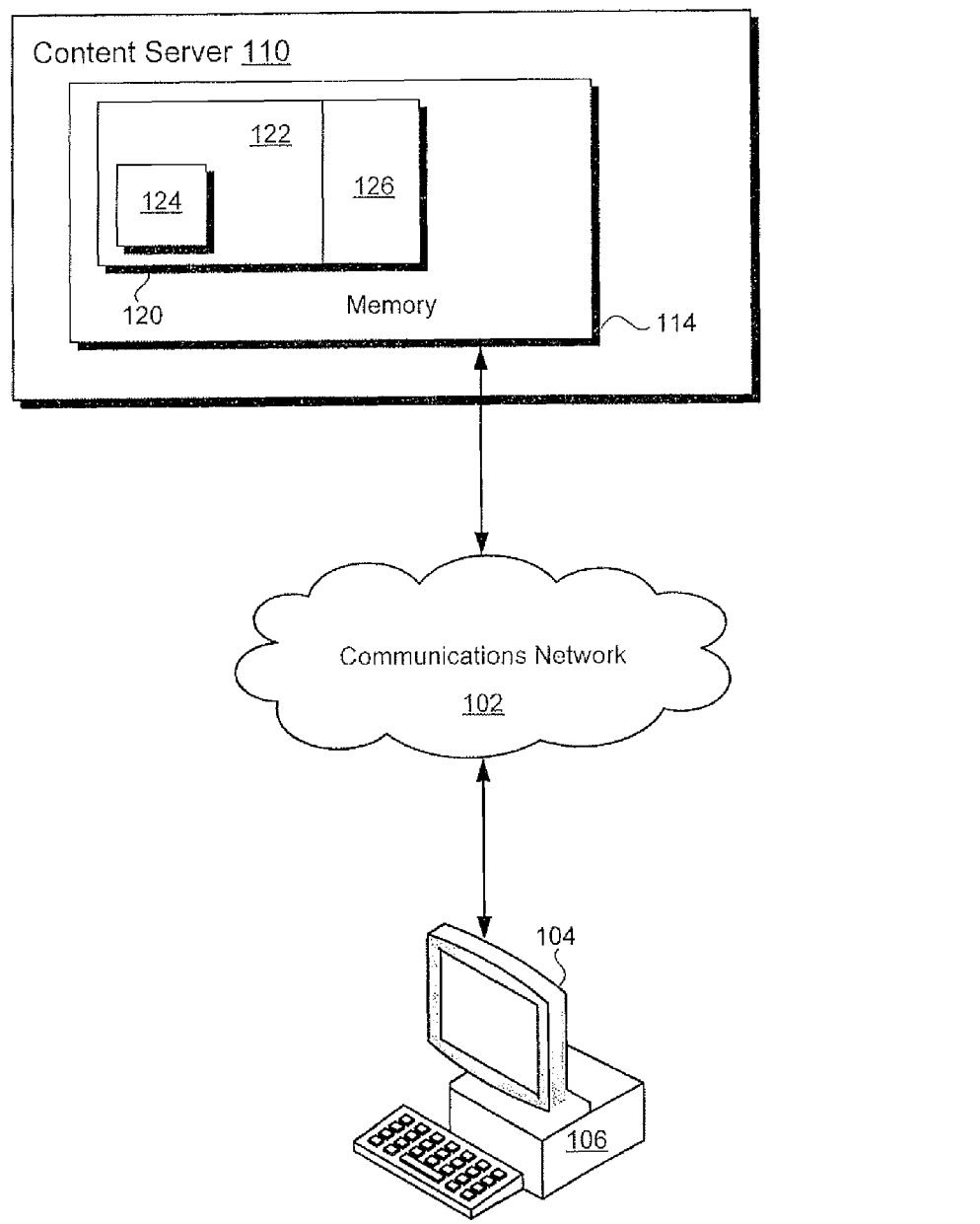
FIG. 1 shows a block diagram of a system for providing media content, according to one embodiment of the present invention.

The present application is directed to a system and method for providing media content. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

The present inventor recognizes that conventional approaches to providing media content may often fail to enable playback and/or rendering systems to optimize presentation of that content. The inventor overcomes this deficiency in the conventional art by disclosing a novel system and method for providing media content. The present application describes a solution that, in one embodiment, conveys information enabling a presentation system to recognize content as playable content prior to rendering the content. Moreover, the solution disclosed herein may also be used to convey information about how a media content creator and/or producer intends a particular item of content to be experienced by a consumer. The present approach provides downstream media presentation modules comprising playback and/or rendering systems with data describing various characteristics of the media content, as well as data guiding optimal presentation of the content within the context of the performance capabilities of the playback and/or rendering systems. Furthermore, the present concepts enable adaptation of the presentation guiding data according to pre-existing configuration of the playback and/or rendering systems.

In one embodiment, the concepts disclosed by the present application are implemented by defining, at the media container level, how a particular content is intended to be presented. This may be accomplished, for example, through use of content-describing metadata that includes presentation parameters defined by the media creators and/or producers. Those presentation parameters are intended to provide information that can be used to adapt the playback and/or rendering processes in the presentation environment, or in some instances, to adapt the presentation environment itself to correspond with the presentation experience intended or desired by the creators and/or producers of the content. Such content-describing metadata may be used to enable playback and/or rendering systems to provide consumers with an optimal presentation experience given available system capabilities. Alternatively, the content-describing metadata may be utilized by the playback and/or rendering systems to inform the consumer of system limitations, and/or optional steps that may be taken to improve or enhance the presentation experience. As a result, presentation systems and/or consumers of the media content may make informed decisions regarding reproduction of the presentation aesthetic intended by the creators and/or producers of the media content, rather than having those decisions be governed entirely by arbitrary or predetermined parameters set by the presentation systems alone.

FIG. 1 shows a block diagram of system 100 for providing media content, according to one embodiment of the present invention. In the embodiment of FIG. 1, system 100 comprises content server 110 including content storage 114. System 100 also includes data structure 120 residing on content storage 114. Stored in data structure 120 are content payload 122 including digital content 124, and content-describing metadata 126. System 100 further includes media presentation module 104, represented as a personal computer (PC), and including processor 106. Also shown in FIG. 1, is communications network 102.

According to the embodiment of FIG. 1, processor 106 of media presentation module 104 may be configured to utilize content-describing metadata 126 to identify digital content 124 as a playable content, copy content payload 122 and content-describing metadata 126, and optimize presentation of digital content 124 on media presentation module 104. For example, processor 106 of media presentation module 104 may be configured to retrieve content payload 122 including digital content 124, and content-describing metadata 126, from data structure 120. Content-describing metadata 126, which is stored separately from digital content 124, is shown in FIG. 1 to reside within data structure 120, but outside of content payload 122. Where data structure 120 comprises a container file structure, for example, content-describing metadata 126 may be stored separately from digital content 124 by being placed in a header of the container file structure.

Content-describing metadata 126 may comprise a variety of distinct types of data to optimize presentation of digital content 124 by media presentation module 104. Content-describing metadata 126 provides content information, which may include media encoding information for digital content 124, one of multiple media profile information for digital content 124, preferred presentation parameters for digital content 124, rules for presenting digital content 124 when at least one of the preferred presentation parameters is not supported by media presentation module 104, and pointers to locations of other data facilitating presentation of digital content 124. Content-describing metadata 126 are configured to provide the content information to media presentation module 104 prior to rendering digital content 124. Content-describing metadata 126 may also be utilized by processor 106 to decode digital content 124 based on the media encoding information to generate the content for presentation. Processor 106 may further configure media presentation module 104 based on content-describing metadata 126 to optimize presentation of digital content 124 within the constraints set by the resource and performance limitations of media presentation module 104, or by pre-existing configuration of media presentation module 104.

System 100 provides a mechanism for the creators and/or producers of digital content 124, to communicate operating parameters corresponding to a preferred presentation experience for a user of media presentation module 104. In addition, system 100 provides a mechanism for adapting the preferred presentation parameters in order to optimize presentation of digital content 124 in response to the presentation environment presented by media presentation module 104. System 100 utilizes data structure 120 as an archive for substantially all of the elements required for optimizing presentation of digital content 124, in a single integrated file format. As mentioned previously, in one embodiment, data structure 120 may comprise a container data structure storing data formatted in a container file format. A container format provides the benefits of flexibility and ease of use, but the present approach may alternatively use a non-container data structure and format.

In some embodiments, content-describing metadata 126 may be generated and associated with digital content 124 when data structure 120 is initially produced. In other embodiments, however, it may be permissible, or even desirable, to allow content-describing metadata 126 to be modified and/or supplemented after initial storage of both digital content 124 and content-describing metadata 126, in data structure 120. The concepts disclosed in the present application embrace static content-describing metadata 126 that cannot be readily changed after production of data structure 120, as well as dynamic or modifiable content-describing metadata 126, or a combination of both types. Static parameters included in content-describing metadata 126 may help to ensure that the initial preferences of the content creators and/or producers are persistently associated with digital content 124. Modifiable parameters included in content-describing metadata 126, on the other hand, enable the presentation of digital content 124 to be adapted for new devices and/or presentation environments, as well as possible changes in the presentation preferences of the content creators and/or producers.

Because system 100 utilizes data structure 120 as an archive for content-describing metadata 126 and content payload 122 in a single integrated data structure, a copy operation performed on data structure 120 transfers content-describing metadata 126 along with core digital content 124 contained in content payload 122. Thus, the present system ensures that content-describing metadata 126 and any updates to that content-describing metadata are persistently stored with digital content 124, through inclusion in data structure 120.

It is noted that although in the embodiment of FIG. 1, media presentation module 104 is represented as a PC, in other embodiments, media presentation module 104 may correspond to any suitable presentation system utilizing integrated or separate playback and rendering units. For example, media presentation module 104 may comprise an integrated playback and rendering system such as a portable digital media player (e.g., iPod), or a PC, as shown in FIG. 1. In another embodiment, media presentation module 104 may comprise separate playback and rendering units, for example, a satellite set-top box, cable box, optical disc player, or gaming console, in combination with a standard definition or high definition television. In yet other embodiments, media presentation module 104 may comprise either a modular or integrated presentation system in combination with intermediate services such as transcoders or network attached storage (NAS), for example.

As shown in the embodiment of FIG. 1, content storage 114 may be accessed through communications network 102. In one such embodiment, content server 110 may comprise a media web server, accessible over a packet network such as the Internet, for example. In other embodiments, content storage 114 may be located on a media server supporting a local area network (LAN), provided at a recreational venue such as a theme park or destination resort, for instance, or included in another type of limited distribution network. In yet other embodiments, content server 110 may correspond to a network connected storage service, a cable provider, or a broadcast provider, for example.

Figure 2:
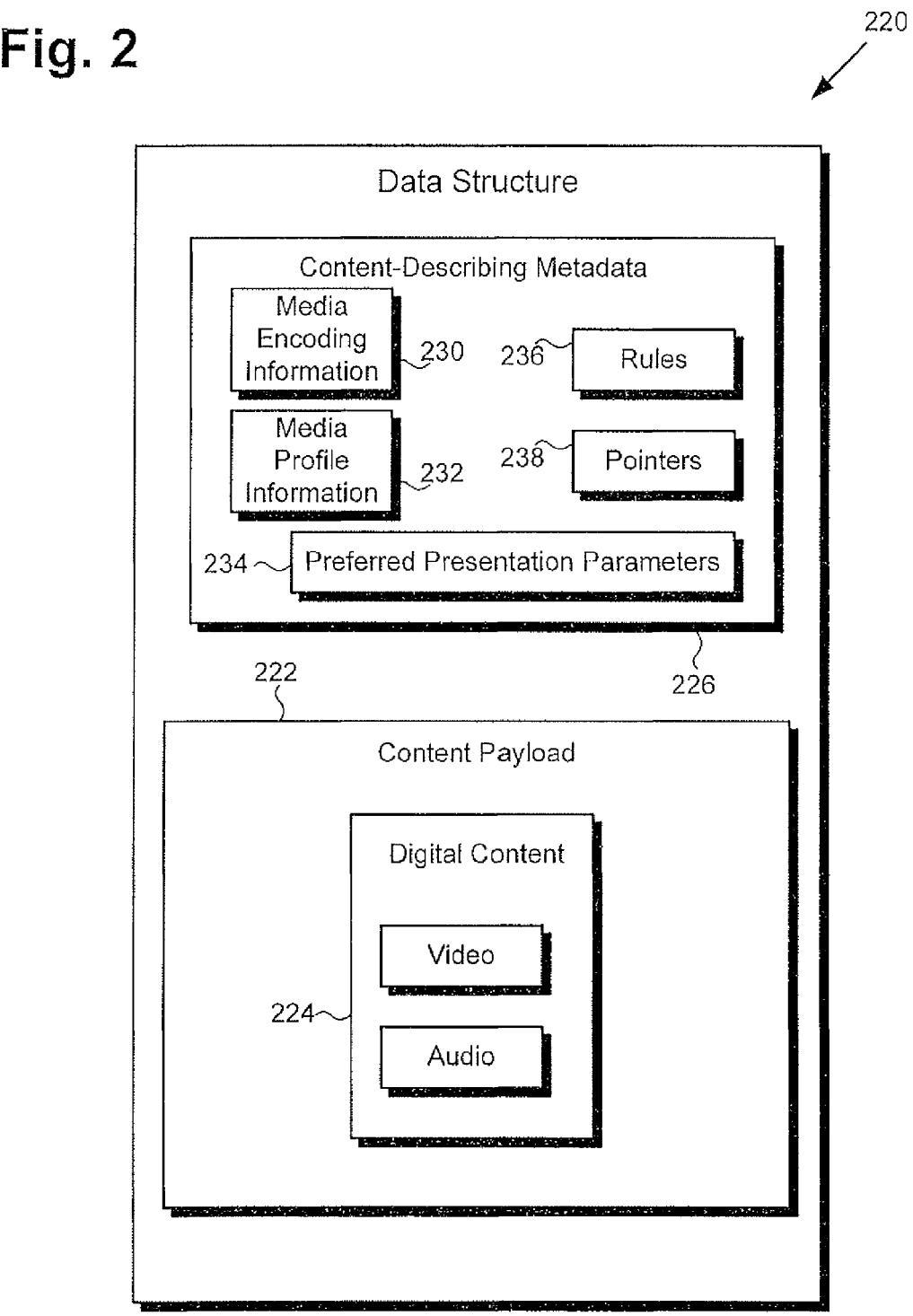
FIG. 2 shows a block diagram of a data structure for use in a system for providing media content, according to one embodiment of the present invention.

The operation of system 100, in FIG. 1, will now be further described with reference to FIG. 2, which shows a block diagram of a data structure for use in a system for providing media content, according to one embodiment of the present invention. FIG. 2 shows data structure 220, which corresponds to data structure 120, in FIG. 1. Stored in data structure 220 are content payload 222 including digital content 224, and content-describing metadata 226, corresponding respectively to content payload 122 including digital content 124, and content-describing metadata 126, in FIG. 1. As was the case for data structure 120, data structure 220, in FIG. 2 may reside on a medium such as content storage 114, in FIG. 1, and be acted on by a processor, such as processor 106 of media presentation module 104. Processor 106 may be configured to effect retrieval of content payload 222 including digital content 224, and self describing metadata 226 stored separately from digital content 224, from data structure 220.

Also shown in FIG. 2 are media encoding information 230, media profile information 232, preferred presentation parameters 234, rules 236, and pointers 238, which are collectively comprised by content-describing metadata 226. It is noted that media encoding information 230, media profile information 232, preferred presentation parameters 234, rules 236, and pointers 238 were previously discussed in conjunction with system 100, but not explicitly shown in FIG. 1. It is further noted that although in the present embodiment, data structure 220 is shown to hold a single content, i.e., digital content 224, in other embodiments, data structure 220 can be configured to store one or more additional versions of the media content corresponding to digital content 224.

Digital content 224, which may itself comprise a media container file structure, can include audio and video elements, as shown in FIG. 2. In one embodiment, for example, digital content 224 may comprise an audio-visual file containing media content including film content, or television program content. In some embodiments, digital content 224 may be a streamable media file suitable for playback by a consumer utilizing a remote presentation system, such as media presentation module 104, in FIG. 1.

As shown in FIG. 2, in one embodiment, content-describing metadata 226 comprises media encoding information 230, media profile information 232, preferred presentation parameters 234, rules 236, and pointers 238. Media encoding information 230 may include a codec profile, bit rate, aspect ratio, and/or frame rate per second of digital content 224, for example. Media encoding information 230 may also comprise a codec resolution profile for the digital content, such as high-definition (HD), standard definition (SD), or a mobile profile. Moreover, media encoding information 230 may comprise a type of codec for the digital content, such as Moving Picture Experts Group (MPEG), or Society of Motion Picture and Television Engineers (SMPTE) 421M, otherwise commonly known as VC-1.

Media profile information 232 may include one or more definitions of the media profile(s) included in content payload 222 of data structure 220. For example, for HD media, media profile information 232 might indicate that data structure 220 is capable of supporting profiles such as HD, standard definition SD, and portable or mobile versions, including target media encoding information, and target transcoding parameters. Preferred presentation parameters 234 may include target presentation information for one or more of the supported media profiles or independent of the supported media profiles, while rules 236 can provide information for adapting the presentation when at least one of the preferred presentation parameters is unsupported by a particular media player and/or rendering system, or is inappropriate for a particular mode of presentation.

For example, rules 236 may include information concerning when or whether closed captioning may be shown, for example, when the rendering device is a television, and when or whether closed captioning should be suppressed, for example, when the media player is integrated with a mobile communication device such as a mobile telephone. As another example, rules 236 may include instructions for adjusting the format from a 4:3 aspect ratio to a widescreen 16:9 format when a portable display supporting both formats is rotated, such as may occur when the user of an iPhone, for instance, rotates that device. As another example, rules 236 may include instructions for adjusting viewing parameters, such as bit rate, aspect ratio and so on, based on capabilities and limitations of the rendering device, for example a television set, received by the playback device, for example an optical disc player, from such rendering device. Pointers 238 provide the location of data facilitating presentation of digital content 224. Pointers 238 may indicate one or more locations internal to data structure 220, such as the location of closed captioning within data structure 220, for example, or to data external to data structure 220, such as by providing a Uniform Resource Identifier (URI) for dynamic linking to external assets.

To summarize the system described by the foregoing discussion, and referring to FIGS. 1 and 2 to do so, system 100 for providing media content comprises content server 110 including content storage 114, and media presentation module 104. Media presentation module 104 includes processor 106 configured to retrieve content payload 222 including digital content 224 from data structure 220. Processor 106 is also configured to retrieve content-describing metadata 226 stored separately from digital content 224, in data structure 220. Content-describing metadata 226 includes content information, and is configured to provide that content information to media presentation module 104 prior to rendering digital content 224. Content-describing metadata 226 includes at least media encoding information 230 for digital content 224, and media profile information 232 for digital content 224.

Processor 106 may be further configured to copy, or otherwise transfer data structure 120 to media presentation module 104, if digital content 224 is identified as playable content. Processor 106 may then configure media presentation module 104 based on media encoding information 230 and media profile information 232, and present the content on a display of media presentation module 104. In instances in which retrieval of content-describing metadata identifies digital content 224 as not a playable content, processor 106 may be configured to display an alert on media presentation module 104, informing a user of media presentation module 104 of the content incompatibility.

In addition to media encoding information 230 and media profile information 232, content-describing metadata 226 may further include one or more of preferred presentation parameters 234 for digital content 224, rules 236 for presenting digital content 224 when at least one of preferred presentation parameters 234 is not supported by media presentation module 104, and pointers 238 to locations of data facilitating presentation of digital content 224. In addition to enabling media presentation module 104 to identify digital content 224 as a playable content prior to rendering digital content 224, content-describing metadata 226 may also be used by processor 106 to optimize presentation of digital content 224 by media presentation module 104. Moreover, in some embodiments, content-describing metadata 226 may include modifiable metadata, enabling supplementation and/or updating of content-describing metadata 226 subsequent to its encoding and storage in data structure 220.

Although the present discussion has thus far described data structure 220 as residing in content storage 114 of content server 110, more generally, data structure 220 may be stored on any suitable computer-readable medium. For example, content payload 222 including digital content 224, and content-describing metadata 226 stored separately from digital content 224, may be stored in data structure 220, such as a container file structure, for example, residing on a computer-readable medium. As a result, content-describing metadata 226 including media encoding information 230 for digital content 224 and media profile information 232 for digital content 224 may be stored on the computer-readable medium. In addition, in some embodiments, one or more of preferred presentation parameters 234 for digital content 224, rules 236 for presenting digital content 224 when at least one of preferred presentation parameters 234 is not supported by media presentation module 104, and pointers 238 to locations of data facilitating presentation of digital content 224, may be stored on the computer-readable medium.

The expression "computer-readable medium," as used in the present application, refers to any medium that provides instructions to a processor, such as processor 106 of media presentation module 104. Thus, a computer-readable medium may correspond to various types of media, such as volatile media, non-volatile media, and transmission media, for example. Volatile media may include dynamic memory, such as dynamic random access memory (dynamic RAM), while non-volatile memory may include optical, magnetic, or electrostatic storage devices. Transmission media may include coaxial cable, copper wire, or fiber optics, for example, or may take the form of acoustic or electromagnetic waves, such as those generated through radio frequency (RF) and infrared (IR) communications. Common forms of computer-readable media include, for example, a compact disc read-only memory (CD-ROM), digital video disc (DVD), or other optical disc; a RAM, programmable read-only memory (PROM), erasable PROM (EPROM), FLASH memory, or a transmission carrier wave.

Turning now to FIG. 3, FIG. 3 shows a flowchart presenting a method for execution by a media presentation module for providing media content, according to one embodiment of the present invention. While steps 310 through 340 indicated in flowchart 300 are sufficient to describe one embodiment of the present invention, other embodiments may utilize steps different from those shown in flowchart 300, or may include more, or fewer steps.

Starting with step 310 in FIG. 3 and referring to system 100 in FIG. 1, step 310 of flowchart 300 comprises retrieving content payload 122 including digital content 124 from data structure 120. Data structure 120 is stored on a medium, which in the embodiment of FIG. 1 is represented by content storage 114. Step 310 may be performed by processor 106 of media presentation module 104. As previously explained, data structure 120 may comprise a container file structure, and digital content 124 may be a streamable media file, for example, provided in a container file format.

Continuing with step 320 of flowchart 300 and referring to FIGS. 1 and 2, step 320 comprises retrieving content-describing metadata 126 stored separately from digital content 124, from data structure 120. As was the case for step 310, step 320 may be performed by processor 106 of media presentation module 104. In one embodiment, as described with reference to step 310, data structure 120 may comprise a container file structure. In that embodiment, content-describing metadata 126 may be retrieved from a header of the container file in step 320. Referring to FIG. 2, content-describing metadata 226, stored separately from digital content 224 and retrieved from data structure 220, in step 320 of flowchart 300, provides content information comprising at least media encoding information 230 for digital content 224 and media profile information 232 for digital content 224.

The method shown in flowchart 300 continues with step 330, which comprises identifying digital content 224 as playable content. As previously explained, content-describing metadata 224 is configured to provide content information to media presentation module 104 prior to rendering digital content 224. As in the present example method, in some instances provision of the content information enables media presentation module to identify digital content 224 as a playable content prior to rendering digital content 224. Step 330 may be performed by processor 106 committing computing resources to initializing decoding of digital content 224. After identifying digital content 224 as playable content, in step 330, processor 106 can configure media presentation module 104 based on media encoding information 230 and media profile information 232, and present the content corresponding to digital content 224 on a display of media presentation module 104.

In one embodiment, the method of flowchart 300 may include copying, or otherwise transferring data structure 120 to media presentation module 104 as an alternative to, or in addition to, presenting the content. In situations where identification of the digital media 224 in step 330 reveals that digital media 224 is not a playable media by media presentation module 104, the present method may further comprise displaying an alert to that effect on media presentation module 104. Such an alert could inform a user of the media content incompatibility, and in some embodiments, suggest one or more user initiated actions to overcome or mitigate the incompatibility.

In some embodiments, not shown by flowchart 300, a method for providing media content may further comprise retrieving preferred presentation parameters 234 for digital content 224, from data structure 220. Such a step may be performed by processor 106 of media presentation module 104. Preferred presentation parameters 234, which may be included in content-describing metadata 226, may be particularly useful at initial setup of the presentation environment, but can be used at other times as well. In some embodiments, preferred presentation parameters 234 may vary at different points during presentation of digital content 224, to account for changing characteristics of the content, for example.

Thus, preferred presentation parameters 234 may be substantially constant and applicable for an entire presentation session, or may be timed or otherwise synchronized such that they automatically or programmatically change during the presentation session. In some embodiments, some or all of preferred presentation parameters 234 may constitute presentation imperatives, where they are supported by the playback and/or rendering systems comprised by media presentation module 104, and may not be overruled either automatically by media presentation module 104, or manually by a consumer. However, in some embodiments, some or all of preferred presentation parameters 234 may be merely advisory, and may be overruled according to preferences determined by the consumer, or by pre-existing configuration of media presentation module 104.

In other embodiment of the method shown in FIG. 3, presentation of the media content may further comprise retrieving rules 236 for presenting digital content 224 when at least one of preferred presentation parameters 234 is not supported by media presentation module 104, and/or retrieving pointers 238 to locations of data facilitating presentation of digital content 224. Content-describing metadata 226 may include one or both of rules 236 and pointers 238 in addition to preferred presentation parameters 234, and/or media encoding information 230 and media profile information 232. As was true for previous steps 310 through 340 shown in flowchart 300, the additional described steps may be performed by processor 106 of media presentation module 104.

In some embodiments, content-describing metadata 226 may include modifiable metadata, enabling supplementation and/or updating of content-describing metadata 226 subsequent to its storage in data structure 220. In one embodiment, modification of content-describing metadata may be performed according to changes provided by the content creators and/or producers, perhaps through content server 110 and communications network 102. In other embodiments, however, it may be advantageous to permit authorized third parties at intermediate points in the distribution of data structure 220 to modify some portions of content-describing metadata 226.

One advantage flowing from the concepts disclosed in the present application that has hitherto not been described, relates to replication of data structure 220 after distribution, such as through transfer of data structure 120, in FIG. 1, to media presentation module 104, over communications network 102. For example, a user of media presentation module (e.g., PC) 104 may wish to download content digital content 124 over communications network 102 (e.g. the Internet), and then copy that content to a portable device. As shown in FIG. 1, digital content 124 is included as part of content payload 122 of integrated data structure 120, which also includes content-describing metadata 126 stored separately from digital content 124. Consequently, transfer of data structure 120 to media presentation module 104 enables the presentation of digital content 124 to be optimized in the context of the playback and rendering capabilities of media presentation module 104. When data structure 120 is copied from media presentation module 104 to another client device or system, moreover, content-describing metadata 126 remains persistently associated with digital content 124, so that presentation of that content may be optimized in whatever subsequent presentation environment data structure 120 is copied to, even when that environment supports playback and/or rendering capabilities substantially different from those of media presentation module 104.

Thus, a system and method for providing media content has been described. The present application has disclosed a solution that defines, at a data structure level, how a particular content is intended by its creators and/or producers to be experienced by a consumer. Content-describing metadata encoded separately from the digital media content and stored in the data structure, provides information that can be used to adapt the decoding and/or rendering processes in the viewing environment, or to adapt the viewing environment itself, to better achieve the intended or desired presentation experience. The content-describing metadata discussed herein allows to provide a more optimal presentation experience within the context of available capabilities, and/or inform the consumer of the opportunity to take action to enhance the presentation experience.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A system for providing a content stored on a non-transitory medium, the system comprising:
an integrated data structure residing on the non-transitory medium, the integrated data structure comprising at least a content-describing metadata and a content payload;
a media presentation module including a processor configured to:
retrieve the content payload including a digital content from the integrated data structure;
retrieve the content-describing metadata stored separately from the digital content within the integrated data structure, the content-describing metadata configured to provide content information, the content information including:
a media encoding information for the digital content; and
a media profile information for the digital content;
render the digital content on a display;
wherein the content-describing metadata are configured to provide the content information to the media presentation module prior to rendering the digital content, wherein the content-describing metadata further comprise preferred presentation parameters for the digital content, and wherein the content-describing metadata further comprise rules for presenting the digital content when at least one of the preferred presentation parameters is not supported by the media presentation module, and wherein the rules provide instructions for adjusting the preferred presentation parameters based on device performance limitations of a rendering device.

2. The system of claim 1, wherein the integrated data structure comprises a container file structure.

3. The system of claim 2, wherein the content-describing metadata are retrieved from a header of the container file structure.

4. The system of claim 1, wherein the content-describing metadata comprise modifiable metadata.

5. The system of claim 1, wherein the media encoding information for the digital content comprises at least one of a bit rate, an aspect ratio, and a frame rate, of the digital content.

6. The system of claim 1, wherein the media profile information for the digital content comprises one of a codec resolution profile for the digital content and a type of codec for the digital content.

7. The system of claim 1, wherein the processor is further configured to copy the integrated data structure to the media presentation module.

8. The system of claim 1, wherein the content-describing metadata further comprise pointers to locations of data external to the integrated data structure for dynamic linking to external assets.

9. A method for execution by a media presentation module for providing a content stored on a non-transitory medium, the method comprising:
storing an integrated data structure on the non-transitory medium, the integrated data structure comprising at least a content-describing metadata and a content payload;
retrieving a content payload including a digital content from a integrated data structure residing on the non-transitory medium;
retrieving the content-describing metadata stored separately from the digital content, within the integrated data structure, the content-describing metadata configured to provide content information, the content information comprising:
a media encoding information for the digital content; and
a media profile information for the digital content;
rendering the digital content on a display;
wherein the content-describing metadata are configured to provide the content information to the media presentation module prior to rendering the digital content, wherein the content-describing metadata further comprise preferred presentation parameters for the digital content, and wherein the content-describing metadata further comprise rules for presenting the digital content when at least one of the preferred presentation parameters is not supported by the media presentation module, and wherein the rules provide instructions for adjusting the preferred presentation parameters based on device performance limitations of a rendering device.

10. The method of claim 9, wherein the integrated data structure comprises a container file structure.

11. The method of claim 10, wherein the content-describing metadata are retrieved from a header of the container file structure.

12. The method of claim 9, wherein the content-describing metadata comprise modifiable metadata.

13. The method of claim 9, wherein the media encoding information for the digital content comprises at least one of a bit rate, an aspect ratio, and a frame rate, of the digital content.

14. The method of claim 9, wherein the media profile information for the digital content comprises one of a codec resolution profile for the digital content and a type of codec for the digital content.

15. The method of claim 9 further comprising copying the integrated data structure to the media presentation module.

16. The method of claim 9, wherein the content-describing metadata further comprise pointers, and wherein the method further comprises dynamically linking to external assets, using the pointers, to locations of data external to the integrated data structure.

17. A method for execution by a media presentation module for providing a content stored on a non-transitory medium, the method comprising:
storing an integrated data structure on the non-transitory medium, the integrated data structure comprising at least a content-describing metadata and a content payload;
retrieving a content payload including a digital content from a integrated data structure residing on the non-transitory medium;
retrieving the content-describing metadata stored separately from the digital content, within the integrated data structure, the content-describing metadata configured to provide content information, the content information comprising:
a media encoding information for the digital content; and
a media profile information for the digital content;
rendering the digital content on a display;
wherein the content-describing metadata are configured to provide the content information to the media presentation module prior to rendering the digital content, wherein the media encoding information includes a codec profile of the digital content, the codec profile being available without encoding the digital content, and wherein the rules provide instructions for adjusting the preferred presentation parameters based on device performance limitations of a rendering device.

18. The method of claim 17, wherein the integrated data structure comprises a container file structure.

19. The method of claim 18, wherein the content-describing metadata are retrieved from a header of the container file structure.

20. The method of claim 17, wherein the content-describing metadata comprise modifiable metadata.

* * * * *